US012663616B2

(12) United States Patent
Wang et al.

(10) Patent No.: US 12,663,616 B2
(45) Date of Patent: Jun. 23, 2026

(54) CAMERA OPTICAL LENS COMPRISING FIRST TO SIXTH LENSES

(71) Applicant: AAC Optics (Suzhou) Co., Ltd., Suzhou (CN)

(72) Inventors: Hongyu Wang, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 314 days.

(21) Appl. No.: 18/620,967

(22) Filed: Mar. 28, 2024

(65) Prior Publication Data
US 2025/0180869 A1 Jun. 5, 2025

(30) Foreign Application Priority Data
Dec. 4, 2023 (CN) .......................... 202311642222.9

(51) Int. Cl.
*G02B 13/00* (2006.01)
*G02B 7/02* (2021.01)
*G02B 9/62* (2006.01)

(52) U.S. Cl.
CPC ......... *G02B 13/0045* (2013.01); *G02B 7/025* (2013.01); *G02B 9/62* (2013.01)

(58) Field of Classification Search
None
See application file for complete search history.

(56) References Cited

U.S. PATENT DOCUMENTS

2023/0076657 A1* 3/2023 Teranishi ............... G02B 13/04

FOREIGN PATENT DOCUMENTS

| CN | 111007649 A | * | 4/2020 | ............. G02B 13/18 |
| CN | 111077653 A | * | 4/2020 | ......... G02B 13/0045 |
| CN | 111552065 A | * | 8/2020 | ......... G02B 15/1461 |
| CN | 114675401 A | * | 6/2022 | ............. G02B 13/18 |

* cited by examiner

*Primary Examiner* — Paul C Lee
(74) *Attorney, Agent, or Firm* — Versch Law Group

(57) ABSTRACT

Disclosed is a camera optical lens. The camera optical lens includes from an object side to an image side in sequence: a first lens having a negative refractive power; a second lens having a positive refractive power; a third lens having a positive refractive power; a fourth lens having a negative refractive power; a fifth lens having a positive refractive power; a sixth lens having a positive refractive power. The camera optical lens further satisfies the following conditions: $0.60 \le f3/f \le 1.20$; $-0.90 \le (R3+R4)/(R3-R4) \le -0.10$; $0.10 \le d2/TTL \le 0.20$; $1.00 \le f6/f \le 5.00$. The camera optical lens has good optical performance.

16 Claims, 12 Drawing Sheets

10

10 mm

20

Longitudinal aberration mm mm

Lateral color

Field curvature

Distortion

Longitudinal aberration mm mm

CAMERA OPTICAL LENS COMPRISING FIRST TO SIXTH LENSES

CROSS REFERENCE TO RELATED APPLICATIONS

The present application claims the benefit of priority under the Paris Convention to Chinese Patent Application No. CN202311642222.9, entitled "CAMERA OPTICAL LENS," filed on Dec. 4, 2023, which is incorporated by reference herein by reference in its entirety.

TECHNICAL FIELD

The present disclosure relates to the field of optical lens, in particular to a camera optical lens suitable for handheld devices, such as smart phones and digital cameras, and camera devices such as monitors, PC lens, and vehicle-mounted lens.

BACKGROUND

With the rise of various smart devices in recent years, the demand for miniaturized camera optical lenses is increasing, and due to the reduction of the pixel size of light-sensitive devices, coupled with the development trend of electronic products with good functions, thin, lightweight, and portable appearance, miniaturized camera optical lenses with good imaging quality have become the mainstream of the current market. In order to obtain a better image quality, a multi-piece lens structure is mostly equipped. Moreover, with the development of technology and the increase of diversified needs of users, the pixel area of light-sensitive devices is constantly shrinking, and the requirements of the system for imaging quality are constantly improving, a camera optical lens with six lenses gradually appears in the lens design. There is an urgent need for camera optical lenses with good optical performance.

SUMMARY

In response to the foregoing technical problems, an object of embodiments of the present disclosure is to provide a camera optical lens, which can meet the design requirements for good optical performance.

To resolve the foregoing technical problems, the present disclosure provides a camera optical lens, including, from an object side to an image side in sequence: a first lens having a negative refractive power; a second lens having a positive refractive power; a third lens having a positive refractive power; a fourth lens having a negative refractive power; a fifth lens having a positive refractive power; a sixth lens having a positive refractive power; wherein the camera optical lens further satisfies the following conditions: $0.60 \le f3/f \le 1.20$; $-0.90 \le (R3+R4)/(R3-R4) \le -0.10$; $0.10 \le d2/TTL \le 0.20$; $1.00 \le f6/f \le 5.00$; where, f represents a focal length of the camera optical lens; f3 represents a focal length of the third lens; R3 represents a central curvature radius of the object side surface of the second lens; R4 represents a central curvature radius of the image side surface of the second lens; d2 represents a distance on-axis from an image side surface of the first lens to an object side surface of the second lens; TTL represents a total optical length of the camera optical lens; f6 represents a focal length of the sixth lens.

As an improvement, wherein the third lens is provided glued to the fourth lens.

As an improvement, the camera optical lens further satisfying following condition: $2.50 \le TTL/f \le 5.00$.

As an improvement, the camera optical lens further satisfying following conditions: $35.00 \le V3-V4 \le 61.00$; where, V3 represents an abbe number of the third lens; V4 represents an abbe number of the fourth lens.

As an improvement, wherein the first lens has a concave image side surface at the proximal axis, and the camera optical lens further satisfying following conditions: $-3.46 \le f1/f \le -0.66$; $0.04 \le (R1+R2)/(R1-R2) \le 2.01$; $0.01 \le d1/TTL \le 0.08$; where, f1 represents a focal length of the first lens; R1 represents a central curvature radius of the object side of the first lens; R2 represents a central curvature radius of the image side of the first lens; d1 represents a thickness on-axis of the first lens.

As an improvement, wherein the second lens has a convex object side surface at the proximal axis and a convex image side surface at the proximal axis; the camera optical lens further satisfying the following conditions: $0.44 \le f2/f \le 3.73$; $0.03 \le d3/TTL \le 0.36$; f2 represents a focal length of the second lens; d3 represents a thickness on-axis of the second lens.

As an improvement, wherein the third lens has a convex object side surface at the proximal axis and a convex image side surface at the proximal axis; the camera optical lens further satisfying the following conditions: $-1.11 \le (R5+R6)/(R5-R6) \le -0.05$; $0.04 \le d5/TTL \le 0.22$; R5 represents a central curvature radius of the object side surface of the third lens; R6 represents a central curvature radius of the image side surface of the third lens; d5 represents a thickness on-axis of the third lens.

As an improvement, wherein the fourth lens has a concave object side surface at the proximal axis and a concave image side surface at the proximal axis; the camera optical lens further satisfying the following conditions: $-1.46 \le f4/f \le -0.24$; $0.04 \le (R7+R8)/(R7-R8) \le 0.87$; $0.01 \le d7/TTL \le 0.05$; f4 represents a focal length of the fourth lens; R7 represents a central curvature radius of the object side surface of the fourth lens; R8 represents a central curvature radius of the image side surface of the fourth lens; d7 represents a thickness on-axis of the fourth lens.

As an improvement, wherein the fifth lens has a convex image side surface at the proximal axis; the camera optical lens further satisfying the following conditions: $0.60 \le f5/f \le 22.03$; $0.01 \le d9/TTL \le 0.16$; f5 represents a focal length of the fifth lens; d9 represents a thickness on-axis of the fifth lens.

As an improvement, wherein the sixth lens has a convex object side surface at the proximal axis; the camera optical lens further satisfying the following conditions: $-18.36 \le (R11+R12)/(R11-R12) \le -0.30$; $0.07 \le d11/TTL \le 0.29$; R11 represents a central curvature radius of the object side surface of the sixth lens; R12 represents a central curvature radius of the image side surface of the sixth lens; d11 represents a thickness on-axis of the sixth lens.

As an improvement, wherein the first lens is made of glass material.

As an improvement, wherein the second lens is made of glass material.

As an improvement, wherein the third lens is made of glass material.

As an improvement, wherein the fourth lens is made of glass material.

As an improvement, wherein the fifth lens is made of glass material.

As an improvement, wherein the sixth lens is made of glass material.

The beneficial effect of the present disclosure are as follows. The camera optical lens designed according to the present disclosure has excellent optical characteristics and good optical performance. The camera optical lens is particularly suitable for in-vehicle lenses, cellular phone camera lens assemblies and WEB camera lenses, which includes camera elements such as CCD (Charge-Coupled Device), CMOS (Complementary Metal-Oxide-Semiconductor) and other camera elements for high pixels.

BRIEF DESCRIPTION OF THE DRAWINGS

In order to more clearly illustrate the technical solutions in the embodiments of the present disclosure, the accompanying drawings to be used in the description in the embodiments will be briefly introduced hereinafter, and the following is a brief introduction of the drawings required in the description of the embodiments. It is obvious that the accompanying drawings in the description hereinafter are only some of the embodiments of the present disclosure, and that for a person having ordinary skill in the art, other accompanying drawings can also be obtained according to these drawings without creative labor.

DETAILED DESCRIPTION OF THE EMBODIMENTS

To make the technical problems to be solved, technical solutions and beneficial effects of the present disclosure more apparent, the present disclosure is described in further detail together with the figure and the embodiments. It should be understood the specific embodiments described hereby is only to explain the present disclosure, not intended to limit the disclosure. It is understandable to a person having ordinary skill in the art that, in various embodiments of the disclosure, many technical details are proposed to enable the reader to better understand the present disclosure. However, even without the technical details and various variations and modifications based on the following embodiments, the technical solution claimed to be protected by the present disclosure can be realized.

Embodiment 1

Figure 1:
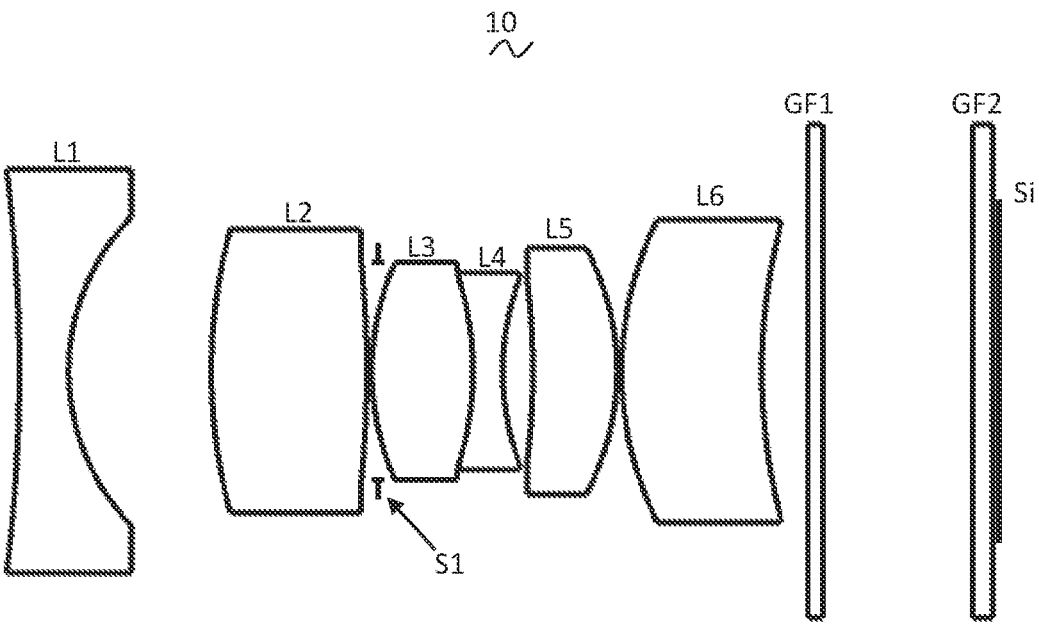
FIG. 1 is a schematic diagram of a camera optical lens in accordance with a first embodiment of the present disclosure.

Embodiment 1 may also be described in the following description as a first embodiment. As referring to FIG. 1, the present disclosure provides a camera optical lens 10. FIG. 1 shows the camera optical lens 10 in embodiment 1 of the present disclosure, the camera optical lens 10 includes 6 lenses. Specifically, from the object side to the image side, the camera optical lens 10 includes in sequence: a first lens L1, a second lens L2, an aperture S1, a third lens L3, a fourth lens L4, a fifth lens L5, and a sixth lens L6. Optical elements like optical filters, an optical filter GF1 and an optical filter GF2, may be arranged between the sixth lens L6 and the image surface Si.

In this embodiment, the first lens L1 is made of glass material, the second lens L2 is made of glass material, the third lens L3 is made of glass material, the fourth lens L4 is made of glass material, the fifth lens L5 is made of glass material, and the sixth lens L6 is made of glass material. Proper selection of glass material as the material of the lens can enhance the optical performance of the camera optical lens 10. In other optional embodiments, the respective lens of the camera optical lens 10 may also be made of other materials.

The focal length of the whole camera optical lens 10 is defined as f, and the focal length of the third lens L3 is defined as f3. The camera optical lens 10 satisfies the following condition: $0.60 \le f3/f \le 1.20$. When the condition is satisfied, by controlling the focal length f3 of the third lens L3, and distributing the focal length reasonably, it is beneficial to control the temperature drift, and the temperature performance is better.

The central curvature radius of the object side surface of the second lens L2 is defined as R3, and the central curvature radius of the image side surface of the second lens L2 is defined as R4. The camera optical lens 10 further satisfies the following condition: $-0.90 \leq (R3+R4)/(R3-R4) \leq -0.10$, which fixes the shape of the second lens L2, and can effectively correct the distortion and astigmatism of the camera optical lens 10 and reduce the possibility of dark corners.

The distance on-axis from the image side surface of the first lens L1 to the object side surface of the second lens L2 is defined as d2, and the total optical length of the camera optical lens 10 is defined as TTL. The following condition: $0.10 \leq d2/TTL \leq 0.20$ should be satisfied. When the condition is satisfied, the distance between the first lens L1 and the second lens L2 is large, so light rays located in the vicinity of the first lens L1 and the second lens L2 can pass smoothly, which is conducive to the improvement of imaging quality.

The focal length of the sixth lens L6 is defined as f6. The following condition should be satisfied: $1.00 \leq f6/f \leq 5.00$, which specifies that the last lens, the sixth lens L6, has a short focal length. When the condition is satisfied, it is beneficial for the light receiving and ensuring the light throughput.

The third lens L3 and the fourth lens L4 are glued together. The third lens L3 and the fourth lens L4, which are provided in a glued configuration, together constitute a glued lens. The glued lens is not only conducive to the correction of the aberration of the image to achieve a high resolution, but also can reduce the tolerance sensitivity issues of the lens unit due to the assembly process, such as tilt and eccentric error. The lens unit includes the third lens L3 and the fourth lens L4.

The camera optical lens 10 also satisfies the following condition: $2.50 \leq TTL/f \leq 5.00$, by which, the ratio between the total optical length TTL of the camera optical lens 10 and the focal length f of the whole camera optical lens 10 is fixed. When the condition is satisfied, the camera optical lens 10 can be miniaturized.

The abbe number of the third lens L3 is defined as V3, and the abbe number of the fourth lens L4 is V4. The following condition should be satisfied: $35.00 \leq V3-V4 \leq 61.00$, by which, material properties can be effectively assigned, the chromatic aberration (i.e., lateral color) can be effectively achromatized, and the imaging quality of the camera optical lens 10 can be improved.

In this embodiment, the first lens L1 has a concave object side surface at the proximal axis, and the first lens L1 has a concave image side surface at the proximal axis. The first lens L1 has a negative refractive power. In other optional embodiments, the object side surface and the image side surface of the first lens L1 may also be provided with other concave and convex distributions.

The focal length of the first lens is defined as f1, the following condition should be satisfied: $-3.46 \leq f1/f \leq -0.66$, which fixes the ratio of the focal length f1 of the first lens L1 to the focal length f of the whole camera optical lens 10. When the condition is satisfied, it is beneficial for achieving ultra-wide angle. Preferably, the following condition shall be satisfied, $-2.16 \leq f1/f \leq -0.83$.

The central curvature radius of the object side surface of the first lens L1 is defined as R1, and the central curvature radius of the image side surface of the first lens L1 is defined as R2. The camera optical lens 10 further satisfies the following condition: $0.04 \leq (R1+R2)/(R1-R2) \leq 2.01$, which fixes the shape of the first lens L1. When the condition is satisfied, it is beneficial for achieving ultra-wide angle. Preferably, the condition $0.06 \leq (R1+R2)/(R1-R2) \leq 1.61$ shall be satisfied.

The thickness on-axis of the first lens L1 is defined as d1. The following condition: $0.01 \leq d1/TTL \leq 0.08$ should be satisfied, by which, it is beneficial for realization of miniaturization. Preferably, the condition $0.01 \leq d1/TTL \leq 0.06$ shall be satisfied.

In this embodiment, the second lens L2 has a convex object side surface at the proximal axis and a convex image side surface at the proximal axis. The second lens L2 has a positive refractive power. In other optional embodiments, the object side surface and the image side surface of the second lens L2 may also be provided with other concave and convex distributions.

In this embodiment, the focal length of the second lens L2 is defined as f2. The following condition should be satisfied: $0.44 \leq f2/f \leq 3.73$, which fixes the ratio of the focal length f2 of the second lens L2 to the focal length f of the whole camera optical lens 10. When the ratio is within this range, the field curvature of the system (i.e., the camera optical lens 10) can be effectively balanced. Preferably, the following condition shall be satisfied, $0.71 \leq f2/f \leq 2.99$.

The thickness on-axis of the second lens L2 is defined as d3. The following condition should be satisfied: $0.03 \leq d3/TTL \leq 0.36$, which is beneficial for realization of miniaturization. Preferably, the following condition shall be satisfied, $0.05 \leq d3/TTL \leq 0.29$.

The third lens L3 has a convex object side surface at the proximal axis and a convex image side surface at the proximal axis. The third lens L3 has a positive refractive power. In other optional embodiments, the object side surface and the image side surface of the third lens L3 may also be provided with other concave and convex distributions.

The central curvature radius of the object side surface of the third lens L3 is defined as R5, and the central curvature radius of the image side surface of the third lens L3 is defined as R6. The following condition should be satisfied: $-1.11 \leq (R5+R6)/(R5-R6) \leq -0.05$, by which, the shape of the third lens L3 is fixed. When the condition is satisfied, the degree of deflection of the light can be reduced and the chromatic aberration (i.e., lateral color) can be effectively corrected. Preferably, the following condition shall be satisfied, $$-0.70 \leq (R5 + R6)/(R5 - R6) \leq -0.06.$$

The thickness on-axis of the third lens L3 is defined as d5. The following condition: $0.04 \leq d5/TTL \leq 0.22$ should be satisfied. When the condition is satisfied, it is beneficial for realization of miniaturization. Preferably, the condition $0.06 \leq d5/TTL \leq 0.18$ shall be satisfied.

In this embodiment, the fourth lens L4 has a concave object side surface at the proximal axis and a concave image side surface at the proximal axis. The fourth lens L4 has a negative refractive power. In other optional embodiments, the object side surface and the image side surface of the fourth lens L4 may also be provided with other concave and convex distributions.

The focal length of the fourth lens LA is defined as f4. The following condition should be satisfied: $-1.46 \leq f4/f \leq -0.24$, which makes the system has better imaging quality and lower sensitivity through the reasonable distribution of focal power. The focal power is relative to the focal length f4. Preferably, the following condition shall be satisfied, −0.91≤f4/f≤−0.30.

The central curvature radius of the object side surface of the fourth lens L4 is defined as R7, and the central curvature radius of the image side surface of the fourth lens L4 is defined as R8. The following condition should satisfied: 0.04≤(R7+R8)/(R7−R8)≤0.87. This condition fixes the shape of the fourth lens L4. When the condition is satisfied, it is beneficial for correcting the aberration of the image of the off axis drawing angle, among other things, as ultra-thin long focus is developed. Preferably, the following condition shall be satisfied, $$0.06 \le (R7 + R8)/(R7 - R8) \le 0.70.$$

The thickness on-axis of the fourth lens L4 is defined as d7. The following condition: 0.01≤d7/TTL≤0.05 should be satisfied. When the condition is satisfied, it is beneficial for realization of miniaturization, Preferably, the following condition shall be satisfied, 0.02≤d7/TTL≤0.04.

In this embodiment, the fifth lens L5 has a concave object side surface at the proximal axis, and the fifth lens L5 has a convex image side surface at the proximal axis. The fifth lens L5 has a positive refractive power. In other optional embodiments, the object and image sides of the fifth lens L5 can also be provided with other concave and convex distributions.

The focal length of the fifth lens L5 is defined as f5. The following condition: 0.60≤f5/f≤22.03 should be satisfied, which enables the system to have better imaging quality and lower sensitivity through the reasonable distribution of the focal power. The focal power is relative to the focal length f5. Preferably, the following condition shall be satisfied, 0.96≤f5/f≤17.62.

The thickness on-axis of the fifth lens L5 is defined as d9. The following condition: 0.01≤d9/TTL≤0.16 should be satisfied. When the condition is satisfied, it is beneficial for realization of miniaturization. Preferably, the following condition shall be satisfied, 0.02≤d9/TTL≤0.13.

In this embodiment, the sixth lens L6 has a convex object side surface at the proximal axis, and the sixth lens L6 has a concave image side surfaces at the proximal axis. The sixth lens L6 has a positive refractive power. In other optional embodiments, the object and image sides of the sixth lens L6 can also be provided with other concave and convex distributions.

The central curvature radius of the object side surface of the sixth lens L6 is defined as R11, and the central curvature radius of the image side surface of the sixth lens L6 is defined as R12. The following condition should be satisfied: −18.36≤(R11+R12)/(R11−R12)≤−0.30, which fixes the shape of the sixth lens L6 that contributes to a smooth transition of the light and improves the imaging quality. Preferably, the following condition shall be satisfied, −11.47≤(R11+R12)/(R11−R12)≤−0.38.

The thickness on-axis of the sixth lens L6 is defined as d11. The following condition: 0.07≤d11/TTL≤0.29 should be satisfied. When the condition is satisfied, it is beneficial for realization of miniaturization. Preferably, the following condition shall be satisfied, 0.11≤d11/TTL≤0.24.

The camera optical lens 10 has good optical performance. Based on the characteristics of the camera optical lens 10, the camera optical lens 10 is particularly suitable for in-vehicle lenses, cellular phone camera lens assemblies and WEB camera lenses, which includes camera elements such as CCD and CMOS for high pixel.

The camera optical lens 10 of the present disclosure will be described below by way of examples. The various symbols recorded in each example are shown below. The unit of the focal length, distance on-axis, center curvature radius, and thickness on-axis is mm.

TTL: Total optical length (the distance on-axis from the object side surface of the first lens L1 to the image Si), and the unit of TTL is mm.

Aperture value FNO: a ratio of the effective focal length of the camera optical lens to the diameter of the incident pupil.

Table 1 shows the design data of the camera optical lens 10 in the first embodiment of the present disclosure.

TABLE 1

| | R | d | | nd | | vd | |
|---|---|---|---|---|---|---|---|
| S1 | ∞ | d0 = | −7.259 | | | | |
| R1 | −31.323 | d1 = | 1.000 | nd1 | 1.5168 | V1 | 64.21 |
| R2 | 4.485 | d2 = | 2.885 | | | | |
| R3 | 10.784 | d3 = | 3.151 | nd2 | 1.8467 | V2 | 23.79 |
| R4 | −23.020 | d4 = | 0.100 | | | | |
| R5 | 5.303 | d5 = | 2.053 | nd3 | 1.6180 | V3 | 63.41 |
| R6 | −6.181 | d6 = | 0.000 | | | | |
| R7 | −6.181 | d7 = | 0.600 | nd4 | 1.8467 | V4 | 23.79 |
| R8 | 5.342 | d8 = | 0.610 | | | | |
| R9 | −14.512 | d9 = | 1.703 | nd5 | 1.8040 | V5 | 46.57 |
| R10 | −5.280 | d10 = | 0.100 | | | | |
| R11 | 6.883 | d11 = | 2.840 | nd6 | 1.8040 | V6 | 46.57 |
| R12 | 11.846 | d12 = | 0.938 | | | | |
| R13 | ∞ | d13 = | 0.300 | ndg1 | 1.5168 | vg1 | 64.17 |
| R14 | ∞ | d14 = | 3.042 | | | | |
| R15 | ∞ | d15 = | 0.400 | ndg2 | 1.5168 | vg2 | 64.17 |
| R16 | ∞ | d16 = | 0.130 | | | | |

Where:

In which, the meaning of the various symbols is as follows.

S1: Aperture;

R: The curvature radius of the optical surface, the central curvature radius in case of lens;

R1: The central curvature radius of the object side surface of the first lens L1;

R2: The central curvature radius of the image side surface of the first lens L1;

R3: The central curvature radius of the object side surface of the second lens L2;

R4: The central curvature radius of the image side surface of the second lens L2; R5: The central curvature radius of the object side surface of the third lens L3;

R6: The central curvature radius of the image side surface of the third lens L3;

R7: The central curvature radius of the object side surface of the fourth lens L4;

R8: The central curvature radius of the image side surface of the fourth lens L4;

R9: The central curvature radius of the object side surface of the fifth lens L5;

R10: The central curvature radius of the image side surface of the fifth lens L5;

R11: The central curvature radius of the object side surface of the sixth lens L6;

R12: The central curvature radius of the image side surface of the sixth lens L6;

R13: The central curvature radius of the object side surface of the optical filter GF1;

R14: The center curvature radius of the image side surface of the optical filter GF1;

R15: The central curvature radius of the object side surface of the optical filter GF2;

R16: The center curvature radius of image side surface of the optical filter GF2;

d: The thickness on-axis of the lens and the distance on-axis between the lenses.

d0: The distance on-axis from the aperture S1 to the object side surface of the first lens L1;

d1: The thickness on-axis of the first lens L1;

d2: the distance on-axis from the image side surface of the first lens L1 to the object side surface of the second lens L2;

d3: The thickness on-axis of the second lens L2;

d4: The distance on-axis from the image side surface of the second lens L2 and the object side surface of the third lens L3;

d5: The thickness on-axis of the third lens L3;

d6: The distance on-axis from the image side surface of the third lens L3 to the object side surface of the fourth lens LA;

d7: The thickness on-axis of the fourth lens L4;

d8: The distance on-axis from the image side surface of the fourth lens LA to the object side surface of the fifth lens L5;

d9: The thickness on-axis of the fifth lens L5;

d10: The distance on-axis from the image side surface of the fifth lens L5 to the object side surface of the sixth lens L6;

d11: The thickness on-axis of the sixth lens L6;

d12: The distance on-axis from the image side surface of the sixth lens L6 and the object side surface of the optical filter GF1;

d13: The thickness on-axis of the optical filter GF1;

d14: The distance on-axis from the image side surface of the optical filter GF1 and the object side surface of the optical filter GF2;

d15: The thickness on-axis of the optical filter GF2;

d16: The distance on-axis from the image side surface of the optical filter GF2 to the image side surface Si;

nd: The refractive power of d line (d line is green light with a wavelength of 550 nm);

nd1: The refractive power of the d line of the first lens L1;

nd2: The refractive power of the d line of the second lens L2;

nd3: The refractive power of the d line of the third lens L3;

nd4: The refractive power of the d line of the fourth lens L4;

nd5: The refractive power of the d line of the fifth lens L5;

nd6: The refractive power of the d line of the sixth lens L6;

ndg1: The refractive power of d line of the optical filter GF1;

ndg2: The refractive power of d line of the optical filter GF2;

vd: The abbe number;

V1: The abbe number of the first lens L1;

V2: The abbe number of the second lens L2;

V3: The abbe number of the third lens L3;

V4: The abbe number of the fourth lens L4;

V5: The abbe number of the fifth lens L5;

V6: The abbe number of the sixth lens L6;

vg1: The abbe number of the optical filter GF1;

vg2: The abbe number of the optical filter GF2.

Figure 2:
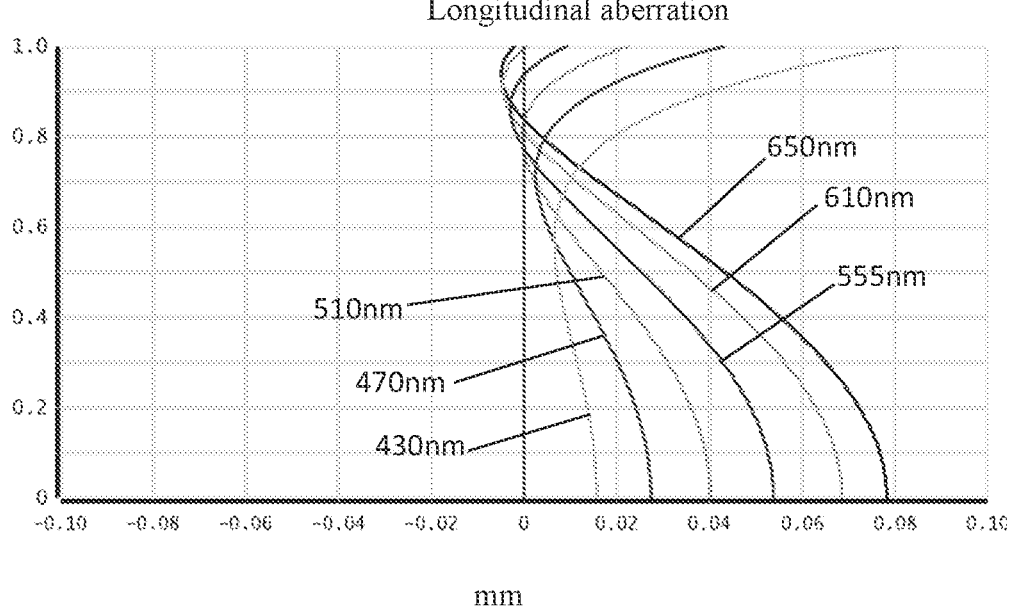
FIG. 2 shows the longitudinal aberration of the camera optical lens shown in FIG. 1.
Figure 3:
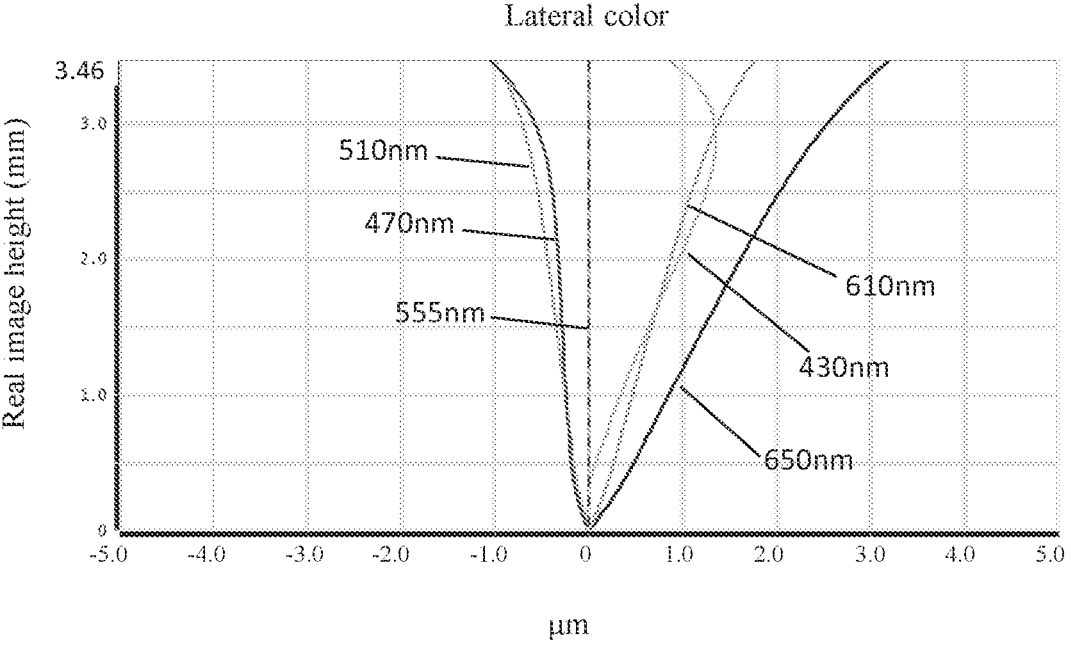
FIG. 3 shows the lateral color of the camera optical lens shown in FIG. 1.
Figure 4:
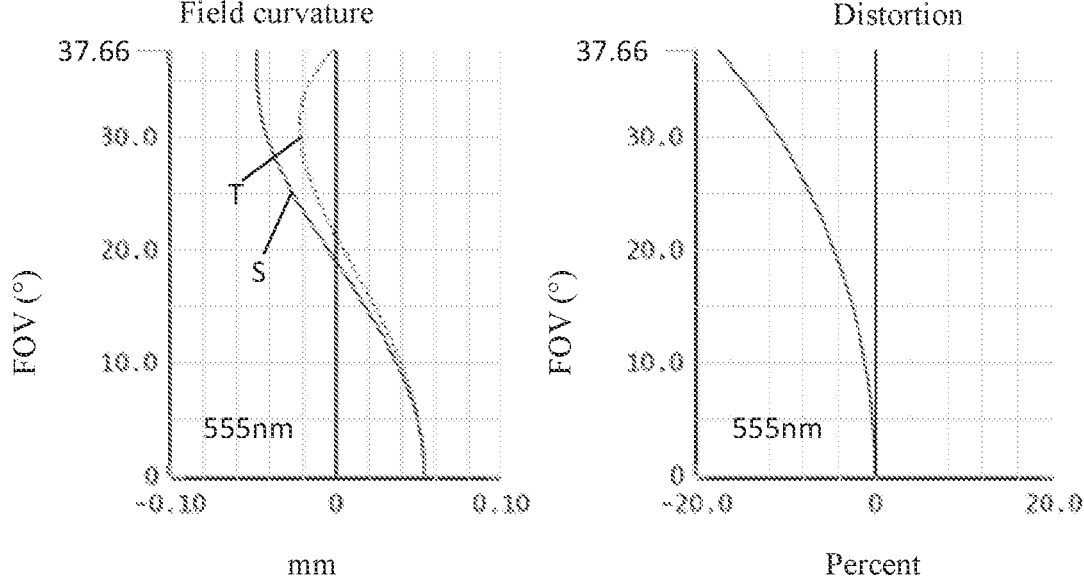
FIG. 4 presents a schematic diagram of the field curvature and distortion of the camera optical lens shown in FIG. 1.

FIG. 2 and FIG. 3 respectively show the longitudinal aberration and lateral color schematic diagrams after light with wavelengths of 650 nm, 610 nm, 555 nm, 510 nm, 470 nm, and 430 nm passes through the camera optical lens 10 in the first embodiment. FIG. 4 shows the schematic diagrams of the field curvature and distortion after light with a wavelength of 555 nm passes through the camera optical lens 10 in the first embodiment. The field curvature S in FIG. 4 is a field curvature in the sagittal direction, and T is the field curvature in the meridian direction.

Table 7, which appears later, shows the various values in each embodiment, and the values corresponding with the parameters which are already fixed in the conditions.

As shown in Table 7, the first embodiment satisfies the various conditions.

In this embodiment, the pupil entering diameter (ENPD) of the camera optical lens 10 is 2.984 mm, the full vision field image height (IH) is 3.460 mm, and the vision field angle (FOV) in the diagonal direction is 75.31°. The camera optical lens 10 has good optical performance. The chromatic aberration on-axis and the chromatic aberration off-axis of the camera optical lens 10 are fully corrected, and the camera optical lens 10 has excellent optical characteristics.

Embodiment 2

Embodiment 2 may also be described in the following description as a second embodiment. The second embodiment is basically the same as the first embodiment, the meaning of its symbols is the same as that of the first embodiment, in the following, only the differences are described.

Figure 5:
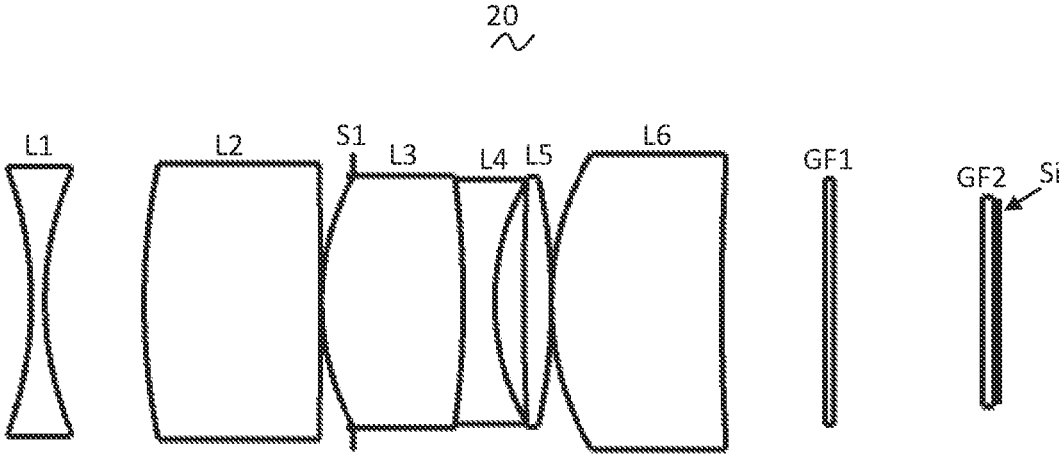
FIG. 5 is a schematic diagram of t a camera optical lens in accordance with a second embodiment of the present disclosure.

FIG. 5 shows the camera optical lens 20 in the second embodiment of the present disclosure. The fifth lens L5 has is convex object side surface at the proximal axis.

Table 2 shows the design data of the camera optical lens 20 in the second embodiment of the present disclosure.

TABLE 2

|  | R |  | d |  | nd |  | vd |
|---|---|---|---|---|---|---|---|
| S1 | ∞ | d0 = | −11.380 |  |  |  |  |
| R1 | −12.717 | d1 = | 0.499 | nd1 | 1.5168 | V1 | 64.21 |
| R2 | 10.867 | d2 = | 3.503 |  |  |  |  |
| R3 | 22.377 | d3 = | 6.209 | nd2 | 1.8467 | V2 | 23.79 |
| R4 | −419.197 | d4 = | 0.050 |  |  |  |  |
| R5 | 8.600 | d5 = | 4.992 | nd3 | 1.6088 | V3 | 58.88 |
| R6 | −30.146 | d6 = | 0.000 |  |  |  |  |
| R7 | −30.146 | d7 = | 1.108 | nd4 | 1.8467 | V4 | 23.79 |
| R8 | 8.027 | d8 = | 1.019 |  |  |  |  |
| R9 | 70.318 | d9 = | 0.981 | nd5 | 1.8040 | V5 | 46.57 |
| R10 | −19.344 | d10 = | 0.008 |  |  |  |  |
| R11 | 9.578 | d11 = | 6.001 | nd6 | 1.8040 | V6 | 46.57 |
| R12 | 75.578 | d12 = | 3.634 |  |  |  |  |
| R13 | ∞ | d13 = | 0.300 | ndg1 | 1.5168 | vg1 | 64.17 |
| R14 | ∞ | d14 = | 5.271 |  |  |  |  |
| R15 | ∞ | d15 = | 0.400 | ndg2 | 1.5168 | vg2 | 64.17 |
| R16 | ∞ | d16 = | 0.200 |  |  |  |  |

Figure 6:
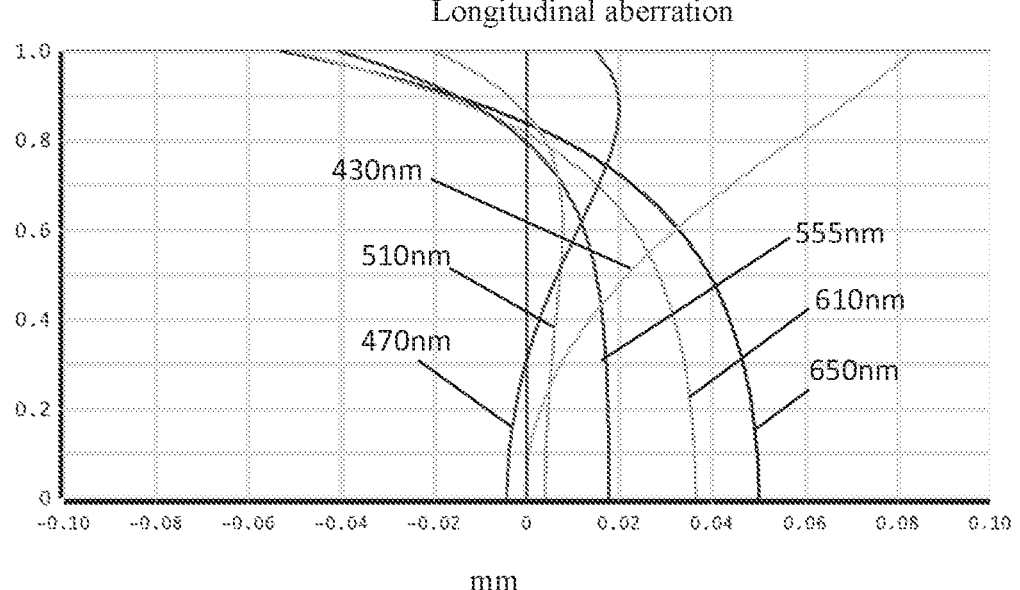
FIG. 6 shows the longitudinal aberration of the camera optical lens shown in FIG. 5.
Figure 7:
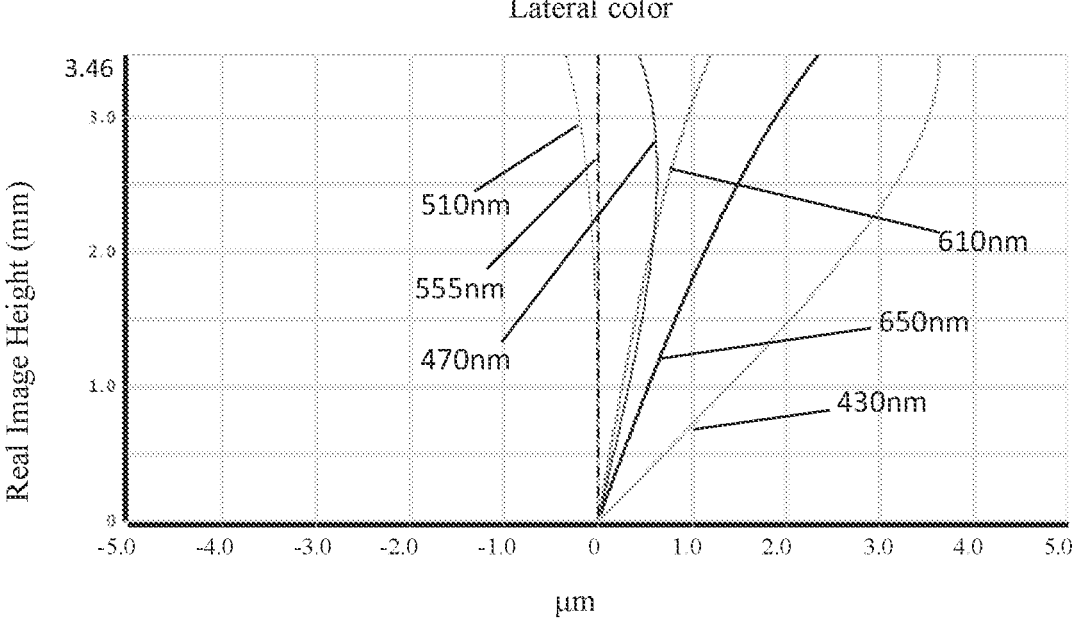
FIG. 7 shows the lateral color of the camera optical lens shown in in FIG. 5.
Figure 8:
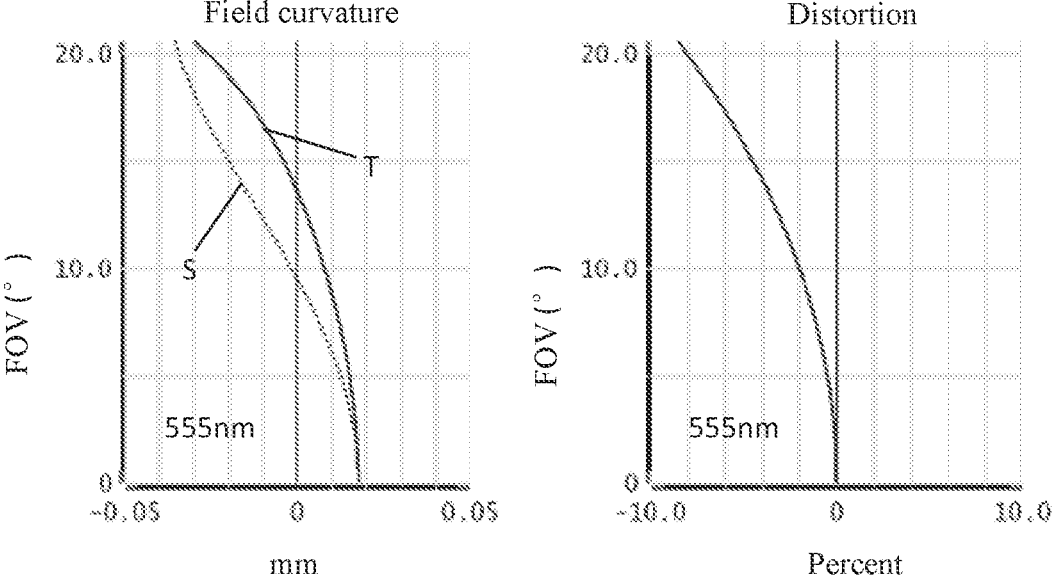
FIG. 8 presents a schematic diagram of the field curvature and distortion of the camera optical lens shown in FIG. 5.

FIG. 6 and FIG. 7 respectively show the longitudinal aberration and lateral color schematic diagrams after light with a wavelength of 650 nm, 610 nm, 555 nm, 510 nm, 470 nm, and 430 nm passes through the camera optical lens 20 in the second embodiment. FIG. 8 shows the schematic diagrams of the field curvature and distortion after light with a wavelength of 555 nm passes through the camera optical lens 20 in the second embodiment. The field curvature S in FIG. 8 is a field curvature in the sagittal direction, and T is the field curvature in the meridian direction.

As shown in Table 7, the second embodiment satisfies the various conditions.

In this embodiment, the pupil entering diameter (ENPD) of the camera optical lens 20 is 5.506 mm, the full vision field image height (IH) is 3.460 mm, and the vision field angle (FOV) in the diagonal direction is 40.00°. The camera optical lens 20 has good optical performance. The chromatic aberration on-axis and the chromatic aberration off-axis of the camera optical lens 10 are fully corrected, and camera optical lens 10 has excellent optical characteristics.

Embodiment 3

Embodiment 3 may also be described in the following description as a third embodiment. The third embodiment is basically the same as the first embodiment, and the meaning of its symbols is the same as the first embodiment, in the following, only the differences are described.

Figure 9:
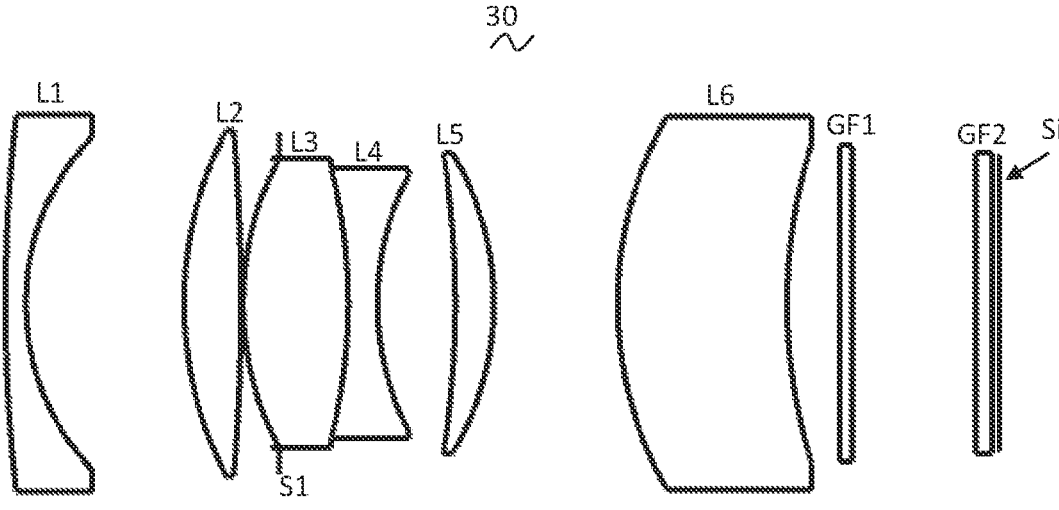
FIG. 9 is a schematic diagram of a camera optical lens in accordance with a third embodiment of the present disclosure.

FIG. 9 shows the camera optical lens 30 in the third embodiment of the present disclosure. The first lens L1 has a convex object side surface at the proximal axis.

Table 3 shows the design data of the camera optical lens 30 in the third embodiment of the present disclosure.

TABLE 3

| | R | d | | nd | | vd |
|---|---|---|---|---|---|---|
| S1 | ∞ | d0 = | −6.749 | | | |
| R1 | 38.447 | d1 = | 0.500 | nd1 | 1.5168 | V1 | 64.21 |
| R2 | 5.578 | d2 = | 3.909 | | | |
| R3 | 8.598 | d3 = | 1.405 | nd2 | 1.8467 | V2 | 23.79 |
| R4 | −47.685 | d4 = | 0.050 | | | |
| R5 | 7.025 | d5 = | 2.601 | nd3 | 1.4970 | V3 | 81.59 |
| R6 | −12.310 | d6 = | 0.000 | | | |
| R7 | −12.310 | d7 = | 0.721 | nd4 | 2.0017 | V4 | 20.71 |
| R8 | 6.357 | d8 = | 1.926 | | | |
| R9 | −21.840 | d9 = | 0.950 | nd5 | 1.8040 | V5 | 46.57 |
| R10 | −6.705 | d10 = | 3.065 | | | |
| R11 | 8.684 | d11 = | 4.186 | nd6 | 1.8040 | V6 | 46.57 |
| R12 | 12.195 | d12 = | 1.304 | | | |
| R13 | ∞ | d13 = | 0.300 | ndg1 | 1.5168 | vg1 | 64.17 |
| R14 | ∞ | d14 = | 3.069 | | | |
| R15 | ∞ | d15 = | 0.400 | ndg2 | 1.5168 | vg2 | 64.17 |
| R16 | ∞ | d16 = | 0.179 | | | |

Figure 10:
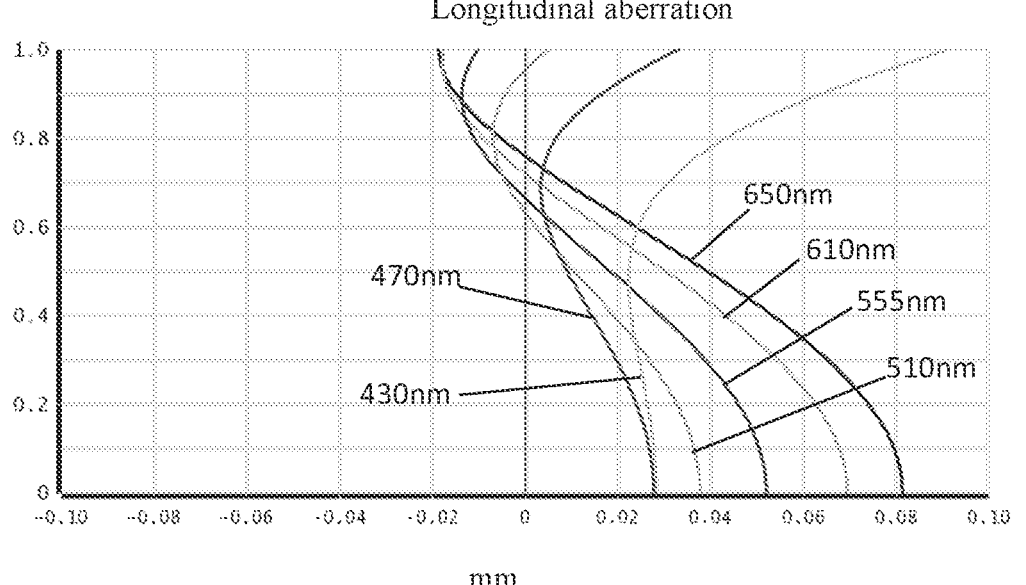
FIG. 10 shows the longitudinal aberration of the camera optical lens shown in FIG. 9.
Figure 11:
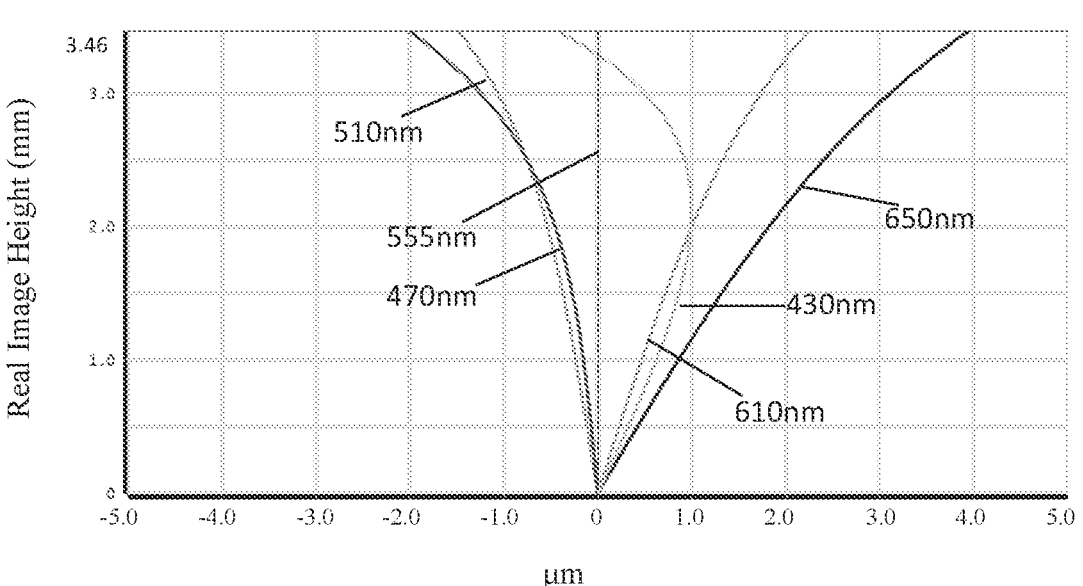
FIG. 11 shows the lateral color of the camera optical lens shown in in FIG. 9.
Figure 12:
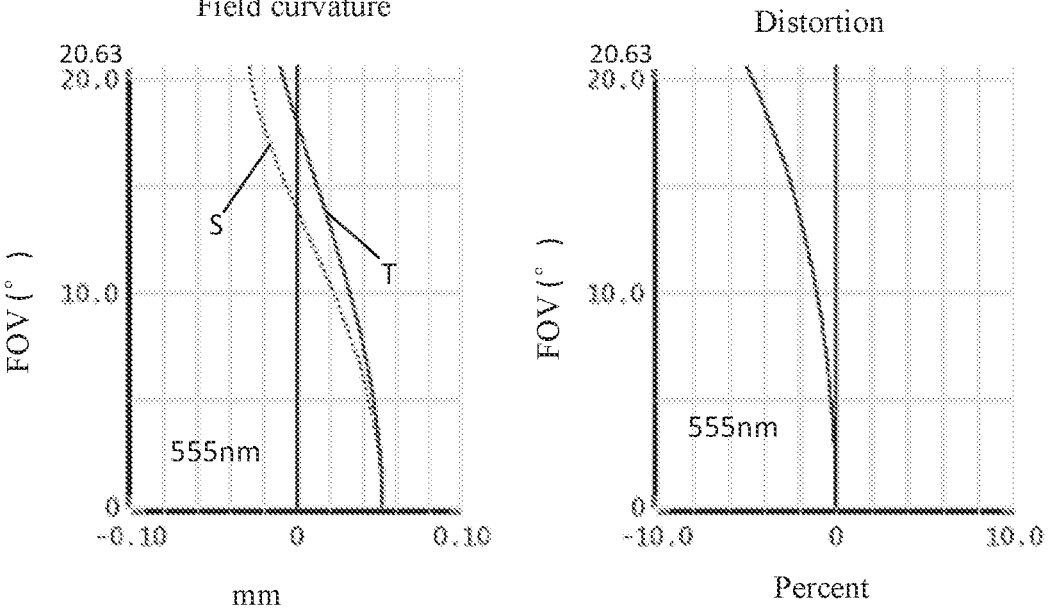
FIG. 12 presents a schematic diagram of the field curvature and distortion of the camera optical lens shown in FIG. 9.

FIG. 10 and FIG. 11 respectively show the longitudinal aberration and lateral color schematic diagrams after light with a wavelength of 650 nm, 610 nm, 555 nm, 510 nm, 470 nm and 430 nm after passes through the camera optical lens 30 in the third embodiment. FIG. 12 shows the field curvature and distortion schematic diagrams after light with a wavelength of 555 nm passes through the camera optical lens 30 in the third embodiment. The field curvature S in FIG. 12 is the field curvature in the sagittal direction, and T is the field curvature in the meridian direction.

Table 7, which appears later, shows the various values in this embodiment in accordance with the above conditions. Obviously, the camera optical lens 30 in this embodiment satisfies the above-described conditions.

In this embodiment, the pupil entering diameter (ENPD) of the camera optical lens 30 is 5.306 mm, the full vision field image height (IH) is 3.460 mm, and the vision field angle (FOV) in the diagonal direction is 41.26°. The camera optical lens 30 has good optical performance. The chromatic aberration on-axis and the chromatic aberration off-axis of the camera optical lens 30 are fully corrected, and camera optical lens 30 has excellent optical characteristics.

Embodiment 4

Embodiment 4 may also be described in the following description as a fourth embodiment The fourth embodiment is basically the same as the first embodiment, and the meaning of its symbols is the same as that of the first embodiment. In the following, only the differences are described.

Figure 13:
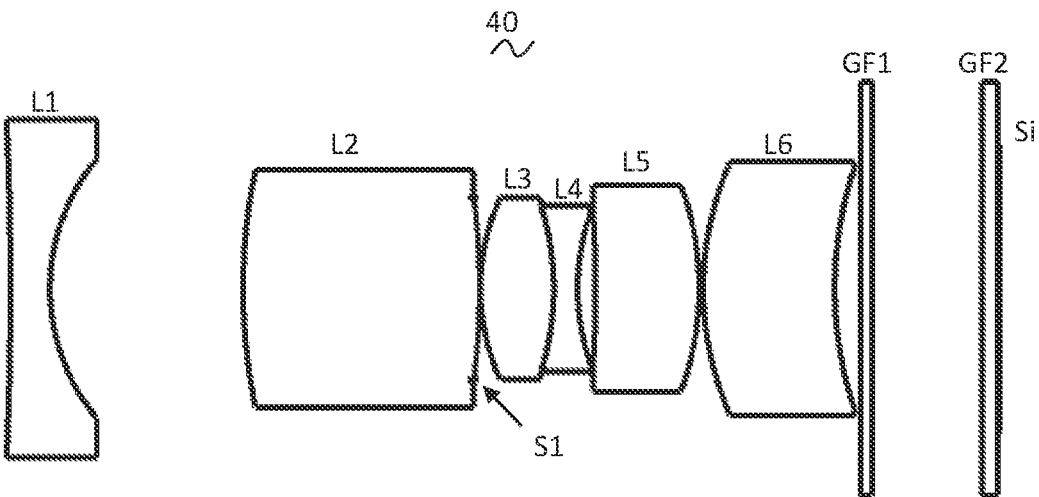
FIG. 13 is a schematic diagram of a camera optical lens in accordance with a fourth embodiment of the present disclosure.

FIG. 13 shows the camera optical lens 40 in the fourth embodiment of the present disclosure.

Table 4 shows the design data of the camera optical lens 40 in the fourth embodiment of the present disclosure.

TABLE 4

| | R | d | | nd | | vd |
|---|---|---|---|---|---|---|
| S1 | ∞ | d0 = | −11.615 | | | |
| R1 | −86.511 | d1 = | 1.000 | nd1 | 1.5168 | V1 | 64.21 |
| R2 | 4.770 | d2 = | 4.844 | | | |
| R3 | 13.663 | d3 = | 5.930 | nd2 | 1.8467 | V2 | 23.79 |
| R4 | −16.831 | d4 = | 0.030 | | | |
| R5 | 5.222 | d5 = | 1.828 | nd3 | 1.6180 | V3 | 63.41 |
| R6 | −6.494 | d6 = | 0.000 | | | |
| R7 | −6.631 | d7 = | 0.600 | nd4 | 1.8467 | V4 | 23.79 |
| R8 | 5.258 | d8 = | 0.452 | | | |
| R9 | −30.700 | d9 = | 2.605 | nd5 | 1.8040 | V5 | 46.57 |
| R10 | −6.835 | d10 = | 0.100 | | | |
| R11 | 7.267 | d11 = | 3.303 | nd6 | 1.8040 | V6 | 46.57 |
| R12 | 9.044 | d12 = | 0.644 | | | |
| R13 | ∞ | d13 = | 0.300 | ndg1 | 1.5168 | vg1 | 64.17 |
| R14 | ∞ | d14 = | 2.747 | | | |
| R15 | ∞ | d15 = | 0.400 | ndg2 | 1.5168 | vg2 | 64.17 |
| R16 | ∞ | d16 = | 0.051 | | | |

Figure 14:
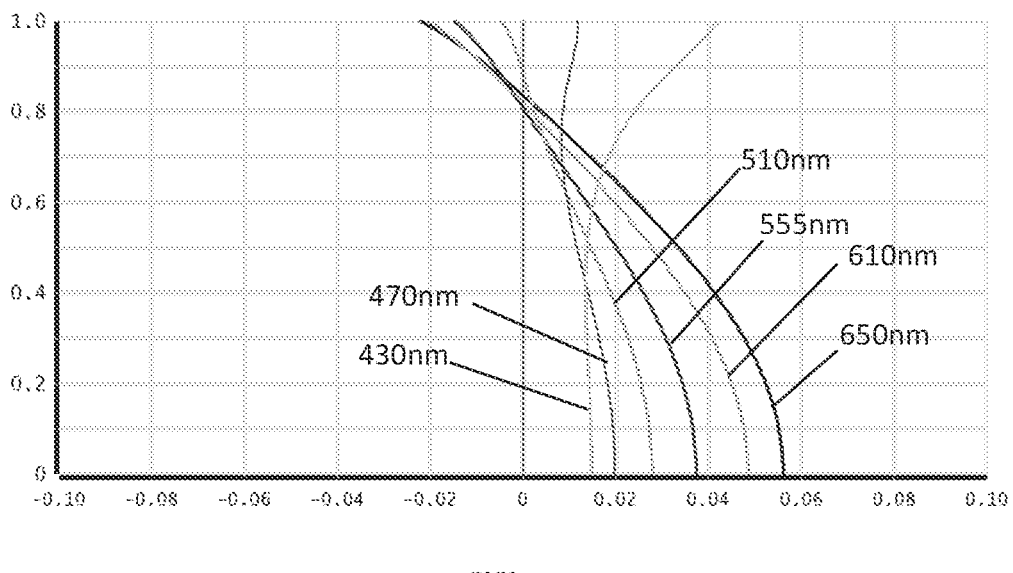
FIG. 14 shows the longitudinal aberration of the camera optical lens shown in FIG. 13.
Figure 15:
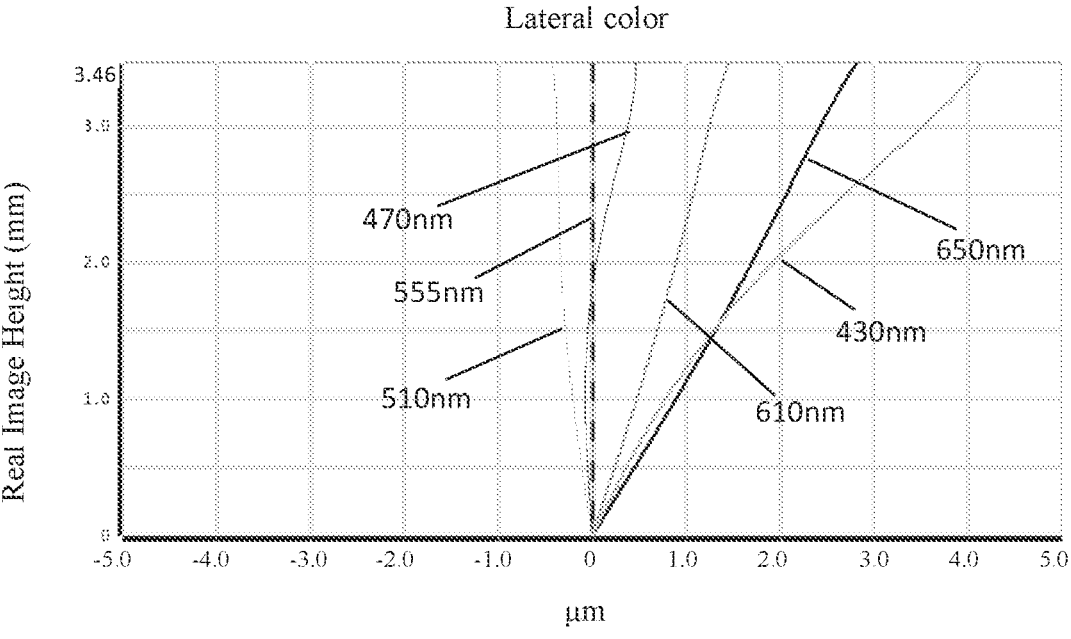
FIG. 15 shows the lateral color of the camera optical lens shown in FIG. 13.
Figure 16:
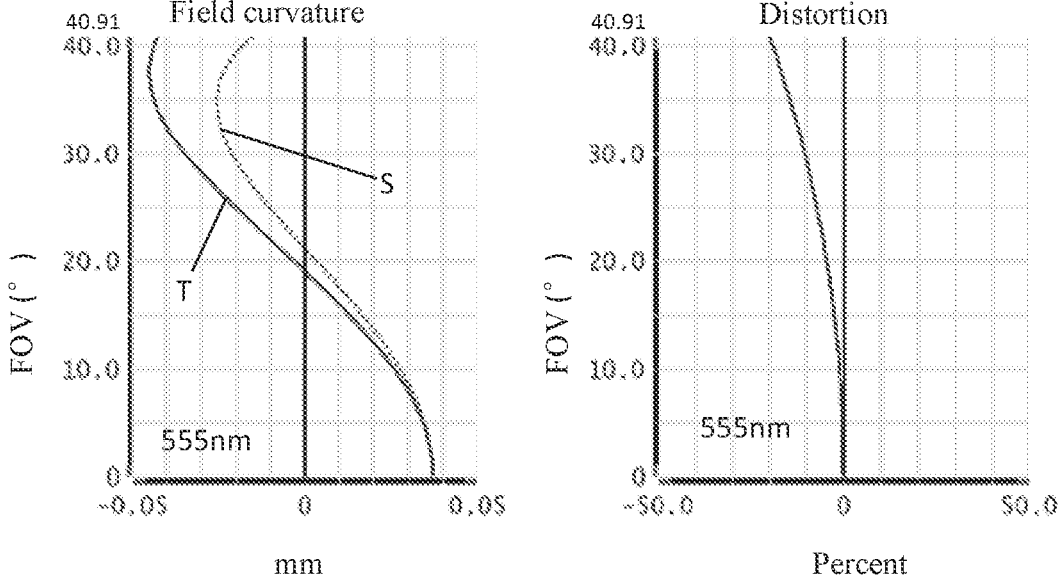
FIG. 16 presents a schematic diagram of the field curvature and distortion of the camera optical lens shown in FIG. 13.

FIG. 14 and FIG. 15 respectively show the longitudinal aberration and lateral color schematic diagrams after light with a wavelength of 650 nm, 610 nm, 555 nm, 510 nm, 470 nm, and 430 nm passes through the camera optical lens 40 in the fourth embodiment. FIG. 16 shows the schematic diagrams of the field curvature and distortion after light with a wavelength of 555 nm passes through the camera optical lens 40 in the fourth embodiment. The field curvature S in FIG. 16 is the field curvature in the sagittal direction, and T is the field curvature in the meridian direction.

Table 7, which appears later, shows the various values in this embodiment in accordance with the above conditions. Obviously, the camera optical lens 40 in this embodiment satisfies the above-described conditions.

In this embodiment, the pupil entering diameter (ENPD) of the camera optical lens 40 is 2.742 mm, the f the full vision field image height (IH) is 3.460 mm, and the vision field angle (FOV) in the diagonal direction is 81.81°. The camera optical lens 40 has good optical performance. The chromatic aberration on-axis and the chromatic aberration off-axis of the camera optical lens 40 are fully corrected, and the camera optical lens 30 has excellent optical characteristics.

Embodiment 5

Embodiment 5 may also be described in the following description as a fifth embodiment. The fifth embodiment is basically the same as the first embodiment, and the meaning of its symbols is the same as that of the first embodiment. In the following, only the differences are described.

Figure 17:
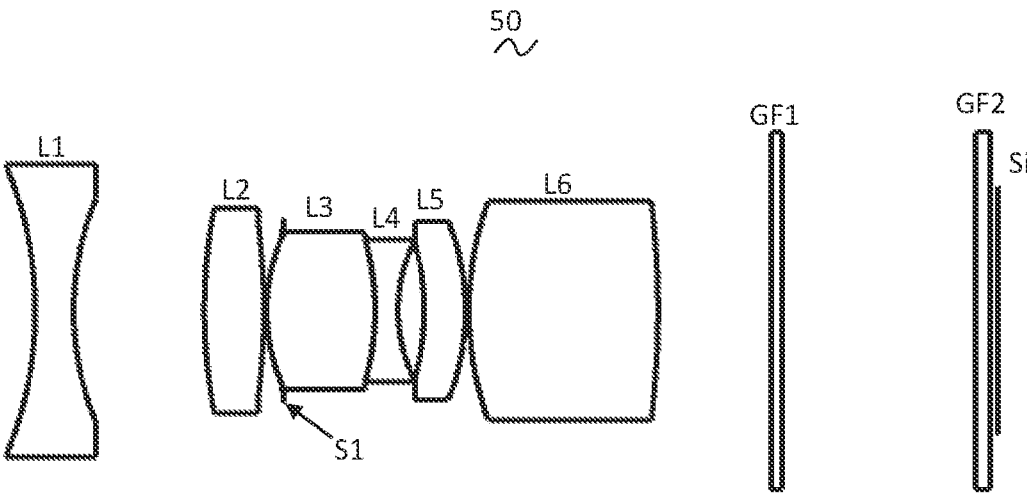
FIG. 17 is a schematic diagram of a camera optical lens in accordance with a fifth embodiment of the present disclosure.

FIG. 17 shows the camera optical lens 50 in the fifth embodiment of the present disclosure. The sixth lens L6 has a convex image side surface at the proximal axis.

Table 5 shows the design data of the camera optical lens 50 in the fifth embodiment of the present disclosure.

TABLE 5

|  | R |  | d |  | nd |  | vd |
|---|---|---|---|---|---|---|---|
| S1 | ∞ | d0 = | −6.494 |  |  |  |  |
| R1 | −11.154 | d1 = | 1.000 | nd1 | 1.5168 | V1 | 64.21 |
| R2 | 8.606 | d2 = | 3.414 |  |  |  |  |
| R3 | 15.600 | d3 = | 1.560 | nd2 | 1.8467 | V2 | 23.79 |
| R4 | −19.460 | d4 = | 0.078 |  |  |  |  |
| R5 | 5.575 | d5 = | 2.833 | nd3 | 1.6180 | V3 | 63.41 |
| R6 | −7.362 | d6 = | 0.000 |  |  |  |  |
| R7 | −7.965 | d7 = | 0.600 | nd4 | 1.8467 | V4 | 23.79 |
| R8 | 4.678 | d8 = | 0.684 |  |  |  |  |
| R9 | −7.264 | d9 = | 1.073 | nd5 | 1.8040 | V5 | 46.57 |
| R10 | −7.264 | d10 = | 0.100 |  |  |  |  |
| R11 | 9.753 | d11 = | 4.940 | nd6 | 1.8040 | V6 | 46.57 |
| R12 | −25.715 | d12 = | 2.944 |  |  |  |  |
| R13 | ∞ | d13 = | 0.300 | ndg1 | 1.5168 | vg1 | 64.17 |
| R14 | ∞ | d14 = | 5.045 |  |  |  |  |
| R15 | ∞ | d15 = | 0.400 | ndg2 | 1.5168 | vg2 | 64.17 |
| R16 | ∞ | d16 = | 0.200 |  |  |  |  |

Figure 18:
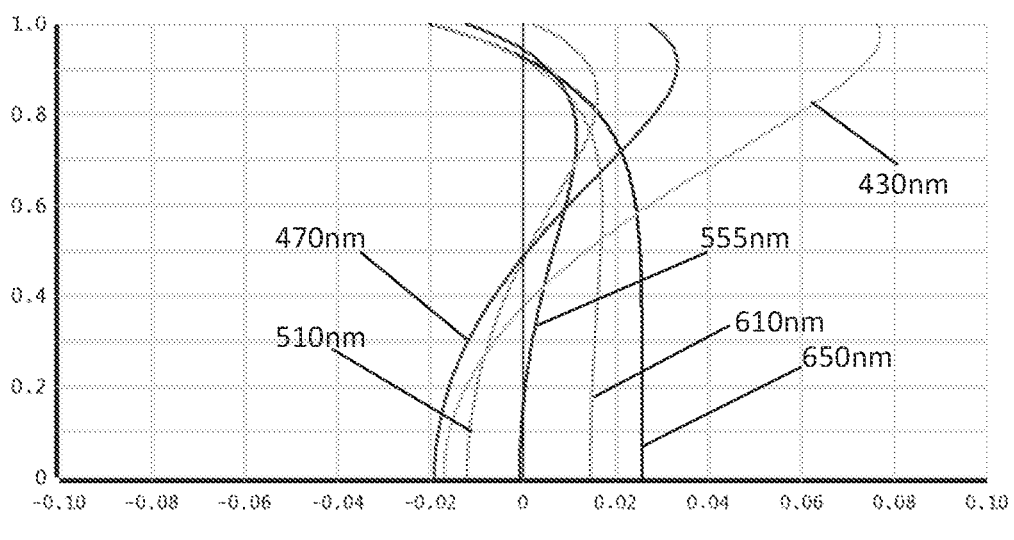
FIG. 18 shows the longitudinal aberration of the camera optical lens shown in FIG. 17.
Figure 19:
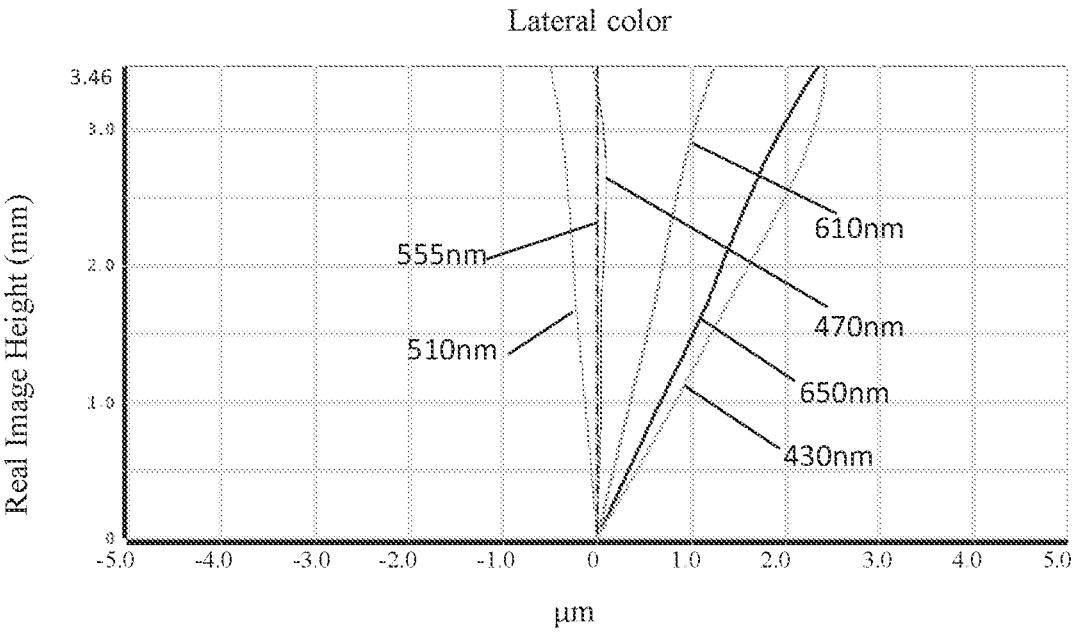
FIG. 19 shows the lateral color of the camera optical lens shown in FIG. 17.
Figure 20:
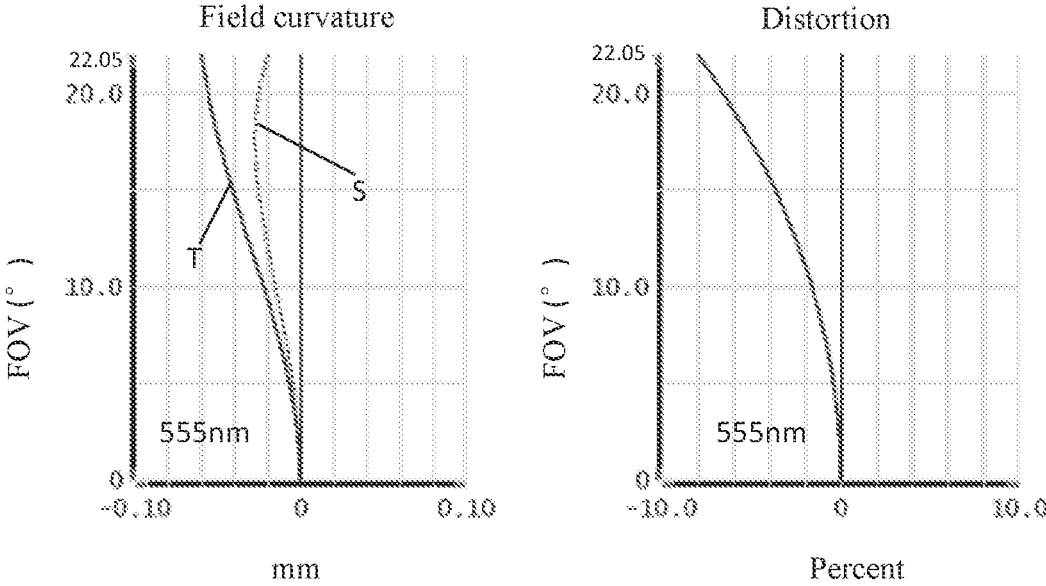
FIG. 20 presents a schematic diagram of the field curvature and distortion of the camera optical lens shown in FIG. 17.

FIG. 18 and FIG. 19 respectively show the longitudinal aberration and lateral color schematic diagrams after light with a wavelength of 650 nm, 610 nm, 555 nm, 510 nm, 470 nm, and 430 nm passes through the camera optical lens 50 in the fifth embodiment. FIG. 20 shows the schematic diagrams of the field curvature and distortion after light with a wavelength of 555 nm passes through the camera optical lens 50 in the fifth embodiment. The field curvature S in FIG. 20 is the field curvature in the sagittal direction, and T is the field curvature in the meridian direction.

Table 7, which appears later, shows the various values in this embodiment in accordance with the above conditions. Obviously, the camera optical lens 50 in this embodiment satisfies the above-described conditions.

In this embodiment, the pupil entering diameter (ENPD) of the camera optical lens 50 is 5.073 mm, the full vision field image height (IH) is 3.460 mm, and the vision field angle (FOV) in the diagonal direction is 44.09°. The camera optical lens 50 has good optical performance. The chromatic aberration on-axis and the chromatic aberration off-axis of the camera optical lens 50 are fully corrected, and the camera optical lens 50 has excellent optical characteristics.

A Contrast Embodiment

The contrast embodiment is basically the same as the first embodiment, and the meaning of its symbols is the same as the first embodiment. Only the differences are described below.

Figure 21:
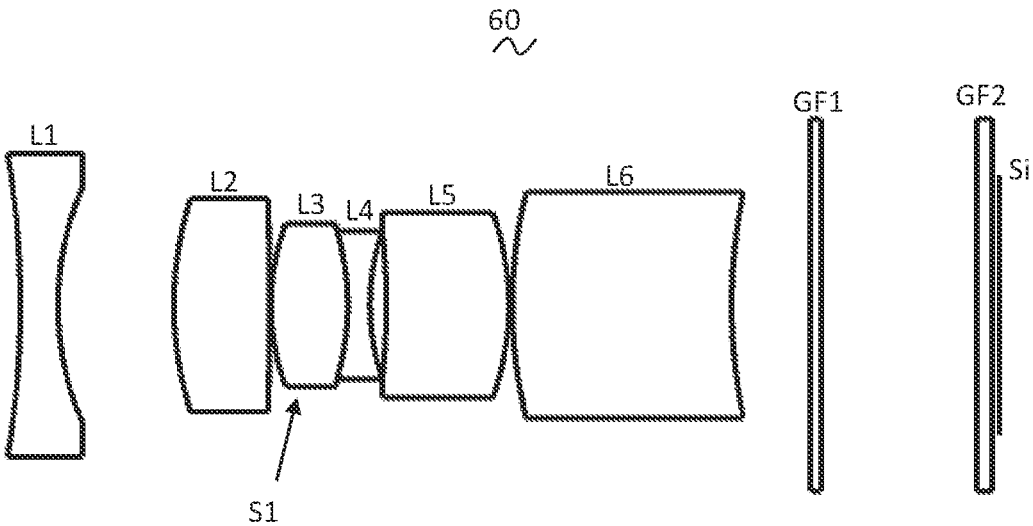
FIG. 21 is a schematic diagram of a camera optical lens in accordance with a comparative embodiment of the present disclosure.

FIG. 21 shows the camera optical lens 60 in the contrast embodiment.

Table 6 shows the design data of the camera optical lens 60 in in the contrast embodiment.

TABLE 6

|  | R |  | d |  | nd |  | vd |
|---|---|---|---|---|---|---|---|
| S1 | ∞ | d0 = | −6.660 |  |  |  |  |
| R1 | −23.465 | d1 = | 1.000 | nd1 | 1.5168 | V1 | 64.21 |
| R2 | 7.841 | d2 = | 3.121 |  |  |  |  |
| R3 | 9.654 | d3 = | 2.557 | nd2 | 1.8467 | V2 | 23.79 |
| R4 | −62.516 | d4 = | 0.050 |  |  |  |  |
| R5 | 6.426 | d5 = | 2.041 | nd3 | 1.6180 | V3 | 63.41 |
| R6 | −7.107 | d6 = | 0.000 |  |  |  |  |
| R7 | −7.135 | d7 = | 0.600 | nd4 | 1.8467 | V4 | 23.79 |
| R8 | 6.024 | d8 = | 0.446 |  |  |  |  |
| R9 | −18.093 | d9 = | 3.280 | nd5 | 1.8040 | V5 | 46.57 |
| R10 | −7.435 | d10 = | 0.100 |  |  |  |  |
| R11 | 12.717 | d11 = | 5.877 | nd6 | 1.8040 | V6 | 46.57 |
| R12 | 14.490 | d12 = | 2.099 |  |  |  |  |
| R13 | ∞ | d13 = | 0.300 | ndg1 | 1.5168 | vg1 | 64.17 |
| R14 | ∞ | d14 = | 4.196 |  |  |  |  |
| R15 | ∞ | d15 = | 0.400 | ndg2 | 1.5168 | vg2 | 64.17 |
| R16 | ∞ | d16 = | 0.200 |  |  |  |  |

Figure 22:
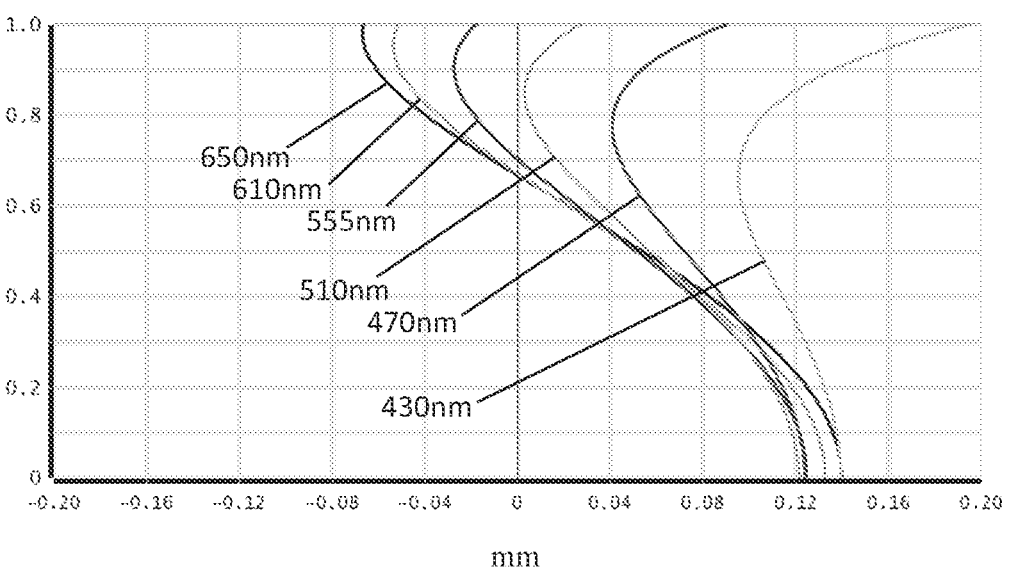
FIG. 22 shows the longitudinal aberration of the camera optical lens shown in FIG. 21.
Figure 23:
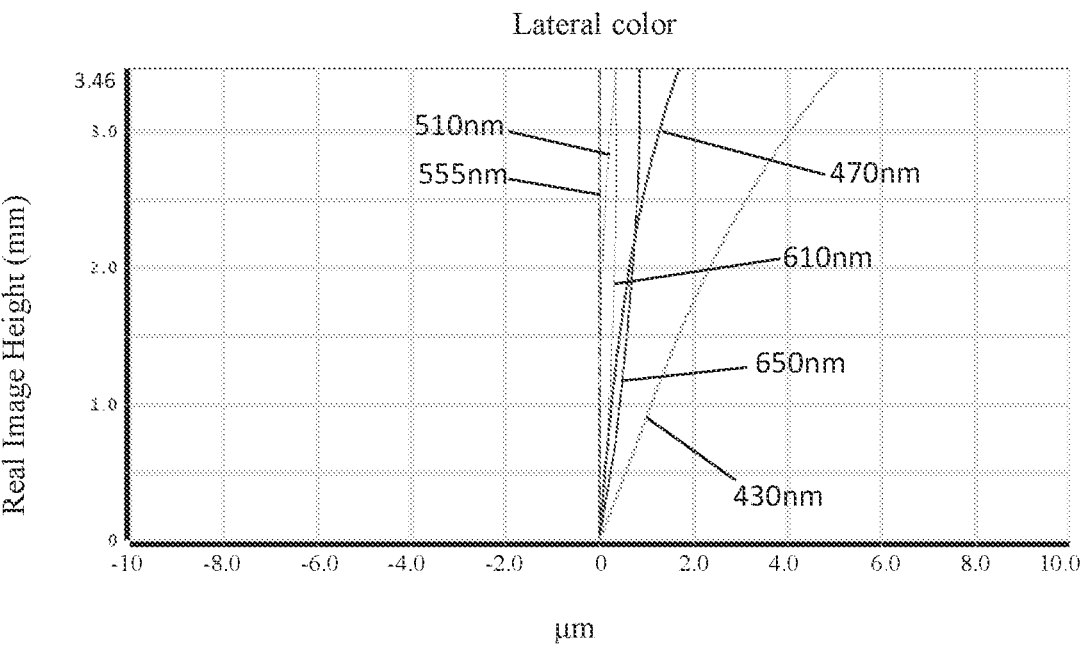
FIG. 23 shows the lateral color of the camera optical lens shown in FIG. 21.
Figure 24:
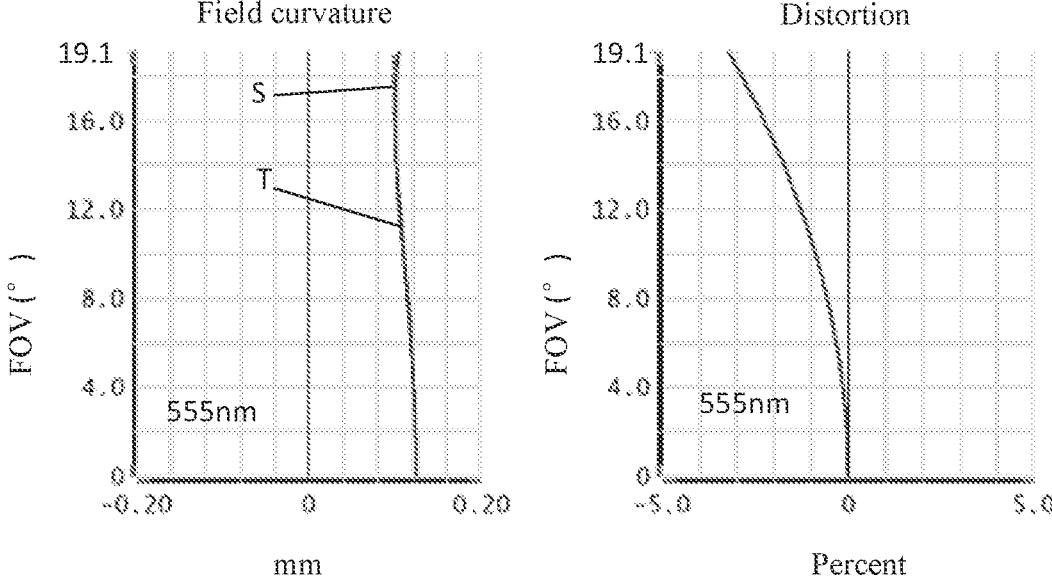
FIG. 24 presents a schematic diagram of the field curvature and distortion of the camera optical lens shown in FIG. 21.

FIG. 22 and FIG. 23 respectively show the longitudinal aberration and lateral color schematic diagrams of after light with a wavelength of 650 nm, 610 nm, 555 nm, 510 nm, 470 nm, and 430 nm passes through the camera optical lens 60 in the contrast embodiment. FIG. 24 shows the schematic diagrams of the field curvature and distortion after light with a wavelength of 555 nm passes through the camera optical lens 60 in the contrast embodiment. The field curvature S in FIG. 24 is the field curvature in the sagittal direction, and T is the field curvature in the meridian direction.

In this embodiment, the pupil entering diameter (ENPD) of the camera optical lens 60 is 5.696 mm, the full vision field image height (IH) is 3.460 mm, and the vision field angle (FOV) in the diagonal direction is 38.20°.

Table 7 below shows the values of the corresponding conditions in the contrast embodiments in accordance with the above conditions. Obviously, the camera optical lens 60 in the contrast embodiment does not meet the above condition: 0.60≤f3/f≤1.20, which cannot improve the chromatic aberration (i.e., lateral color).

TABLE 7

| Parameters and conditions | Embodiment 1 | Embodiment 2 | Embodiment 3 | Embodiment 4 | Embodiment 5 | the contrast embodiment |
|---|---|---|---|---|---|---|
| f3/f | 0.905 | 1.143 | 0.968 | 0.990 | 0.602 | 0.554 |
| (R3 + R4)/(R3 − R4) | −0.362 | −0.899 | −0.694 | −0.104 | −0.110 | −0.732 |
| d2/TTL | 0.145 | 0.103 | 0.159 | 0.195 | 0.136 | 0.119 |
| f6/f | 2.968 | 1.296 | 2.511 | 4.988 | 1.006 | 4.980 |
| TTL/f | 3.635 | 3.392 | 2.530 | 4.948 | 2.711 | 2.520 |
| V3 − V4 | 39.620 | 35.093 | 60.889 | 39.618 | 39.618 | 39.618 |
| f | 5.461 | 10.076 | 9.709 | 5.018 | 9.284 | 10.424 |
| f1 | −7.498 | −11.225 | −12.655 | −8.690 | −9.214 | −11.217 |
| f2 | 8.994 | 25.065 | 8.639 | 9.709 | 10.363 | 9.966 |
| f3 | 4.943 | 11.519 | 9.400 | 4.966 | 5.587 | 5.778 |
| f4 | −3.280 | −7.333 | −4.070 | −3.360 | −3.381 | −3.750 |
| f5 | 9.500 | 18.888 | 11.660 | 10.386 | 136.347 | 13.748 |
| f6 | 16.209 | 13.059 | 24.381 | 25.032 | 9.342 | 51.912 |
| FNO | 1.830 | 1.830 | 1.830 | 1.830 | 1.830 | 1.830 |
| TTL | 19.852 | 34.175 | 24.564 | 24.834 | 25.171 | 26.266 |

It can be understood by a person of ordinary skill in the art that the above embodiments are specific embodiments of the realization of the present disclosure, and that various changes can be made thereto in form and detail in practical application without departing from the spirit and scope of the present disclosure.

What is claimed is:

1. A camera optical lens, comprising, from an object side to an image side in sequence:

a first lens having a negative refractive power;

a second lens having a positive refractive power;

a third lens having a positive refractive power;

a fourth lens having a negative refractive power;

a fifth lens having a positive refractive power;

a sixth lens having a positive refractive power;

wherein the camera optical lens further satisfies the following conditions:

$$0.60 \le f3/f \le 1.20;$$

$$-0.90 \le (R3+R4)/(R3-R4) \le -0.10;$$

$$0.10 \le d2/TTL \le 0.20;$$

$$1.00 \le f6/f \le 5.00;$$

where, f represents a focal length of the camera optical lens;

f3 represents a focal length of the third lens;

f6 represents a focal length of the sixth lens;

R3 represents a central curvature radius of the object side surface of the second lens;

R4 represents a central curvature radius of the image side surface of the second lens;

d2 represents a distance on-axis from an image side surface of the first lens to an object side surface of the second lens;

TTL represents a total optical length of the camera optical lens.

2. The camera optical lens according to claim 1, wherein the third lens is provided glued to the fourth lens.

3. The camera optical lens according to claim 1, further satisfying following condition:

$$2.50 \le TTL/f \le 5.00.$$

4. The camera optical lens according to claim 1, further satisfying following conditions:

$$35.00 \le V3 - V4 \le 61.00;$$

where,

V3 represents an abbe number of the third lens;

V4 represents an abbe number of the fourth lens.

5. The camera optical lens according to claim 1, wherein the first lens has a concave image side surface at the proximal axis, and the camera optical lens further satisfying following conditions:

$$-3.46 \le f1/f \le -0.66;$$

$$0.04 \le (R1+R2)/(R1-R2) \le 2.01;$$

$$0.01 \le d1/TTL \le 0.08;$$

where, f1 represents a focal length of the first lens;

R1 represents a central curvature radius of the object side surface of the first lens;

R2 represents a central curvature radius of the image side surface of the first lens;

d1 represents a thickness on-axis of the first lens.

6. The camera optical lens according to claim 1, wherein the second lens has a convex object side surface at the proximal axis and a convex image side surface at the proximal axis; the camera optical lens further satisfying the following conditions:

$$0.44 \le f2/f \le 3.73;$$

$$0.03 \le d3/TTL \le 0.36;$$

f2 represents a focal length of the second lens;

d3 represents a thickness on-axis of the second lens.

7. The camera optical lens according to claim 1, wherein the third lens has a convex object side surface at the proximal axis and a convex image side surface at the proximal axis; the camera optical lens further satisfying the following conditions:

$$-1.11 \le (R5+R6)/(R5-R6) \le -0.05;$$

$$0.04 \le d5/TTL \le 0.22;$$

R5 represents a central curvature radius of the object side surface of the third lens;

R6 represents a central curvature radius of the image side surface of the third lens;

d5 represents a thickness on-axis of the third lens.

8. The camera optical lens according to claim 1, wherein the fourth lens has a concave object side surface at the proximal axis and a concave image side surface at the proximal axis; the camera optical lens further satisfying the following conditions:

$$-1.46 \le f4/f \le -0.24;$$

$$0.04 \le (R7+R8)/(R7-R8) \le 0.87;$$

$$0.01 \le d7/TTL \le 0.05;$$

f4 represents a focal length of the fourth lens;

R7 represents a central curvature radius of the object side surface of the fourth lens;

R8 represents a central curvature radius of the image side surface of the fourth lens;

d7 represents a thickness on-axis of the fourth lens.

9. The camera optical lens according to claim 1, wherein the fifth lens has a convex image side surface at the proximal axis; the camera optical lens further satisfying the following conditions:

$$0.60 \leq f5/f \leq 22.03;$$

$$0.01 \leq d9/TTL \leq 0.16;$$

f5 represents a focal length of the fifth lens;

d9 represents a thickness on-axis of the fifth lens.

10. The camera optical lens according to claim 1, wherein the sixth lens has a convex object side surface at the proximal axis; the camera optical lens further satisfying the following conditions:

$$-18.36 \leq (R11 + R12)/(R11 - R12) \leq -0.30;$$

$$0.07 \leq d11/TTL \leq 0.29;$$

R11 represents a central curvature radius of the object side surface of the sixth lens;

R12 represents a central curvature radius of the image side surface of the sixth lens;

d11 represents a thickness on-axis of the sixth lens.

11. The camera optical lens according to claim 1, wherein the first lens is made of glass material.

12. The camera optical lens according to claim 1, wherein the second lens is made of glass material.

13. The camera optical lens according to claim 1, wherein the third lens is made of glass material.

14. The camera optical lens according to claim 1, wherein the fourth lens is made of glass material.

15. The camera optical lens according to claim 1, wherein the fifth lens is made of glass material.

16. The camera optical lens according to claim 1, wherein the sixth lens is made of glass material.

\* \* \* \* \*